United States Patent [19]

Solenthaler

[11] 4,341,152
[45] Jul. 27, 1982

[54] CONTRIVANCE FOR SHELLING A GRANULAR PRODUCT

[75] Inventor: Karl Solenthaler, Teufen, Switzerland

[73] Assignee: Gebrueder Buehler AG, Switzerland

[21] Appl. No.: 204,825

[22] Filed: Nov. 7, 1980

Related U.S. Application Data

[63] Continuation of Ser. No. 69,902, Aug. 27, 1979, abandoned.

[30] Foreign Application Priority Data

Mar. 8, 1979 [CH] Switzerland ............... 2244/79

[51] Int. Cl.³ .................. B02B 3/00; B02B 7/02
[52] U.S. Cl. ........................ 99/609; 99/519; 99/524; 99/617
[58] Field of Search ............ 99/489, 519, 524, 568, 99/571, 574, 580, 600, 609–612, 612–615, 617; 241/275, 102; 193/2 R, 44, 47

[56] References Cited

U.S. PATENT DOCUMENTS

| 460,489 | 9/1891 | Topp | 193/2 R |
| 1,918,398 | 7/1933 | Johnson | 193/2 R |
| 2,218,444 | 10/1940 | Vineyard | 193/2 R |
| 2,352,327 | 6/1944 | Kirn | 99/609 |

FOREIGN PATENT DOCUMENTS 679191  2/1964  Canada ........................ 99/519

*Primary Examiner*—Philip R. Coe
*Assistant Examiner*—Timothy F. Simone
*Attorney, Agent, or Firm*—Merchant, Gould, Smith, Edell, Welter & Schmidt

[57] ABSTRACT

A contrivance for shelling a granular product, in particular soy beans, sunflower seeds and the like, is provided with a distribution head that is rotatable about its longitudinal axis. This latter displays in its wall axis-symmetrical arranged passthrough openings to which radially oriented guideways (11) connect. In order to impart a uniform acceleration to all grains, passthrough openings (20) are structured slot-fashion and extend, at least partially, in the direction of the longitudinal axis in such fashion that the product, with the distribution head (10) rotating, moves veil-fashion along the guideways (11).

7 Claims, 9 Drawing Figures

4,341,152

CONTRIVANCE FOR SHELLING A GRANULAR PRODUCT

This is a continuation of application Ser. No. 069,902, filed Aug. 27, 1979, abandoned.

BACKGROUND OF THE INVENTION

1. Field of the Invention

The present invention concerns a contrivance for shelling a granular product, in particular soy beans, sunflower seeds and the like, having a distribution head that is rotatable about its longitudinal axis, said distribution head displaying in its wall axially aligned passthrough openings to which radially oriented guideways connect.

2. Description of the Prior Art

A contrivance of this type is described for example in German Pat. No. 718 538. In that contrivance, the granular product is fed into the distribution head through a hopper. This latter, with respect to its axis of rotation, displays two diametrically opposed passthrough openings to which are connected dispersion tubes as radial guideways. The use of tubularform guideways brings about the disadvantage that the resistance forces acting upon the individual grains inside the tube, in particular in the case of different degrees of filling, can not be controlled and, consequently, the individual grains experience different accelerations. Resulting from this, for the impact energy with which the individual grains strike against the deflecting plates that concentrically surround the acceleration mechanism, is a broad dispersion and a correspondingly poorer degree of shelling. With only partial filling of the radial tubes, arising as a further disadvantage is an undesired conveying of air, which requires additional driving energy.

SUMMARY OF THE INVENTION

The task set forth for the present invention is to improve a contrivance of the initially mentioned type such that the individual grains are accelerated as uniformly as possible along the guideways.

In accordance with the invention, this task is resolved by the fact that the passthrough openings are structured slot-fashion and extend, at least partially, in the direction of the longitudinal axis in such fashion that the product, with the distribution head rotating, moves veil-fashion along the guideways (11).

BRIEF DESCRIPTION OF THE DRAWINGS

The invention is explained by way of example with the aid of the schematic drawing. Shown are.

DESCRIPTION OF THE PREFERRED EMBODIMENT

Figure 1:
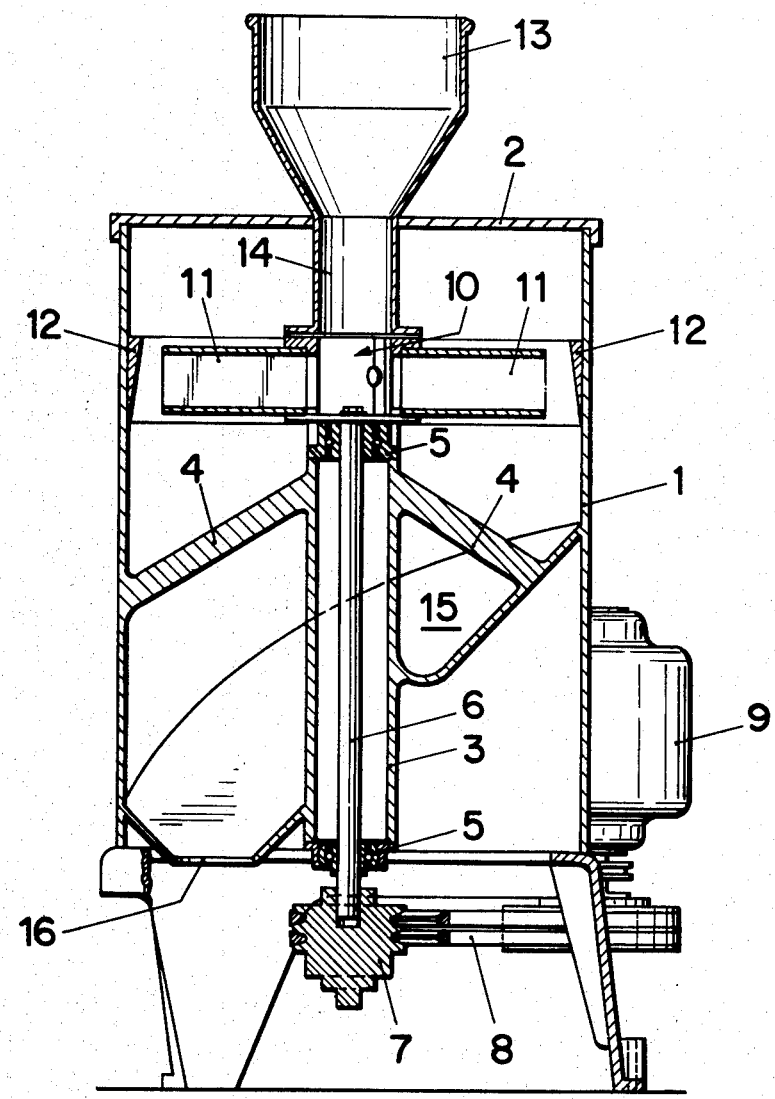
FIG. 1 a vertical cut through a shelling contrivance.

The contrivance in accordance with FIG. 1 displays a machine housing 1 that is open at the top and that can be closed off by a cover 2. Fixedly arranged in the vertical axis of machine housing 1 and laterally strutbraced with trusses 4 is a bearing tube 3. Installed at the two ends of bearing tube 3 are ball bearings 5 in which is rotatably journaled a drive shaft 6. Mounted rotatably fixed at the lower end on drive shaft 6 is a V-belt pulley 7 that can be driven through means of V-belts 8 from the output drive shaft of a drive motor 9. Screwed on axially at the upper end of drive shaft 6 is a distribution head 10 from which guideways 11 bear away in the radial direction. The distribution head 10 and the guideways 11 are concentrically surrounded by deflecting plates 12 that are joined to machine housing 1.

Installed in a central opening in the cover 2 is a feed hopper 13. Its hopper tube 14 opens out axially into the distribution head 10. The granular product to be shelled is loaded into the feed hopper 13 from which it flows out into the distribution head 10. With the distribution head 10 rotating, the grains are centrifuged against the deflecting plates 12 where, upon striking, they divide into kernel and shell. The thusly separated granular product drops downwardly from the deflecting plates 12 into a spiral chute 15 and slides on this latter to a discharge outlet 16.

Figure 2:
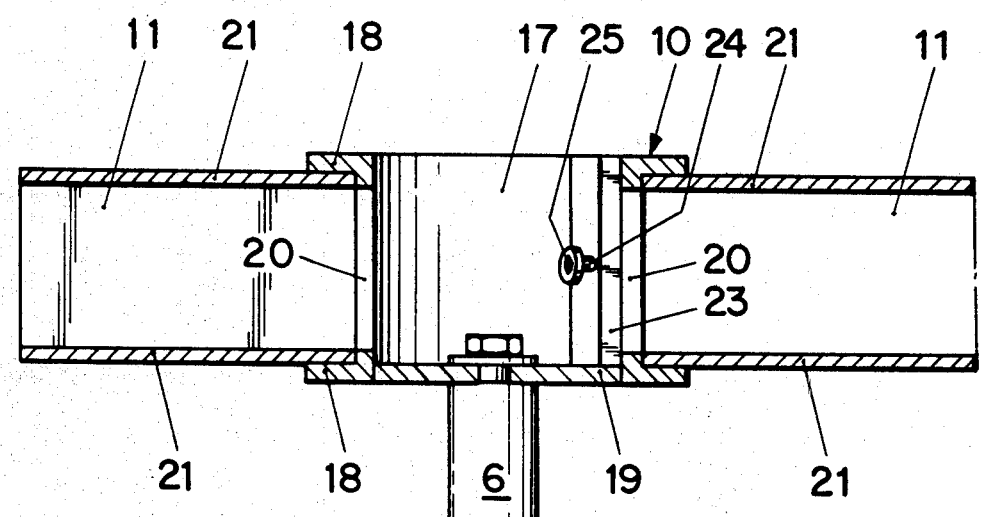
FIG. 2 a detail out of FIG. 1, in an enlarged illustration, corresponding to the cut II—II in FIG. 3.
Figure 3:
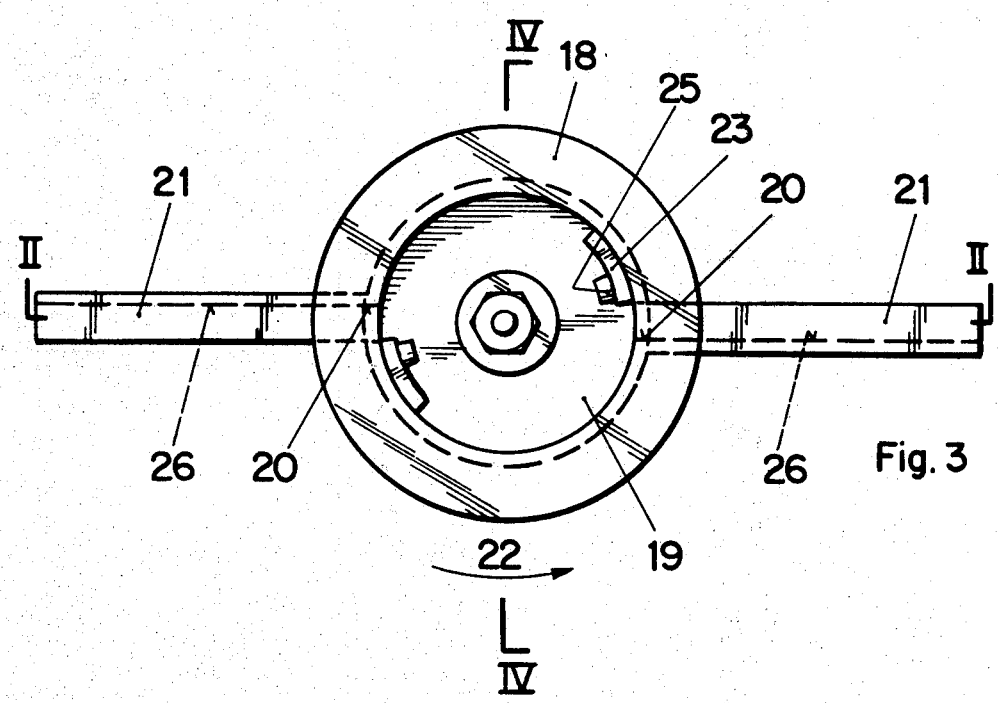
FIG. 3 a top view onto FIG. 2.
Figure 4:
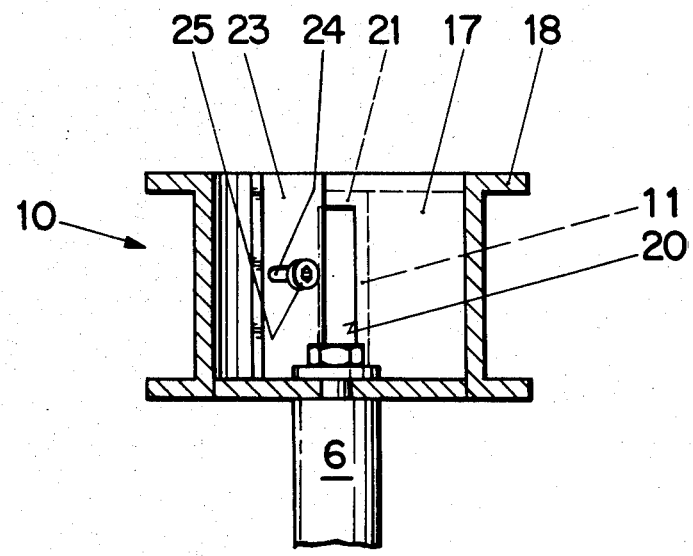
FIG. 4 a cut along line IV—IV in FIG. 3.

As FIGS. 2 to 4 show, the distribution head 10 consists of a ringlike, cylindrical body 17 that is provided with larger diameter flanges 18 on its ends. The cylindrical body 17 is closed off at the lower end by a base plate 19, which is in turn rotatably joined with the drive shaft 6. Arranged diametrically opposed to each other in the wall of body 17 are two passthrough openings 20 to which are radially connected on the outside the guideways 11. The passthrough openings 20 are structured slot-shaped (rectangular in the preferred embodiment) and preferably extend in the direction of the lines of generation of the ring-cylinder body 17 (i.e. parallel to the axis of shaft 6 and body 17). Their length is at least 3 times their width. The width of the passthrough openings 20 is preferably 1.5 to 3 times the grain diameter of the product being processed, i.e. it is selected large enough so that the grains can pass through the passthrough openings. The channel-shaped guideways 11 are of a U-profile or cross section, whose webs or side walls 21 lead in the direction of rotation of the distribution head 10 (see arrow 22). The guide surface 26 of guideways 11 lying between the webs 21 connects coplanarly to one wall of passthrough openings 20.

With the distribution head 10 rotating, the grains piled up inside are driven through openings 20 by the action of the centrifugal force. The speed of rotation is to be selected high enough to guarantee a veil-like distribution of the grains along the guide surfaces 26. In the region of the guideways 11, the grains rest next to each other against the leading guide surfaces 26. In this fashion, all grains are accelerated uniformly. The radial acceleration of the grains in the region of the passthrough openings 20 amounts to at least 20 g, preferably to more than 50 g. At the end of the guideways 11, the grains leave the guide surfaces in their veil-like arrangement and deflect against deflection plates 12. Because of the two-dimensional distribution of the individual grains along guideways 11, there is no possibility that a kernel at deflection plate 12 will strike the preceding kernel that is going in the radial direction.

Guaranteed by this is not only that all grains are accelerated uniformly along guideways 11, but also, which is just as important, that the grains at the deflecting plates 12 do not strike the preceding grains, thereby braking them without their shell being loosened from the kernel.

In accordance with one example of embodiment that is not illustrated, more than two guideways 11 can be provided symmetrically about the axis of rotation of the distribution head 10, provided that sufficient time remains for the grains at the deflecting plate 12 to fall away from it before the grains strike upon it from the next following guideway 11.

The width of the slot-shaped cutouts 20 is selectable, corresponding to the grain size of the granular product, by means of adjustable plates 23. The ring segment shaped plates 23 are each provided with a slot 24 that is oriented in the circumferential direction of the cylindrical body 17, through which is passed a locking screw 25 that is tightened down in a tapped hole, which is not illustrated, in the cylindrical body 17. By loosening the locking screw 25, plate 23 can be displaced in the direction of its slot 24, whereby it covers over more or less of the passthrough opening 20. When the plate 23 has been placed in the desired position, the locking screw 25 is again tightened.

The plate 23 can be omitted whenever the granular product to be treated displays an approximately constant kernel diameter, to which the width of the passthrough openings 20 is adjusted.

According to an example of embodiment that is not illustrated, in place of plates 23 a ring-cylindrical box can be installed rotatably inside body 17, which in turn displays two diametrically opposed cutouts corresponding to cutouts 20. By rotating the box relative to the ring-cylindrical body 17, the cutouts can be brought more or less into conformance and the passthrough cross section correspondingly increased or decreased.

Figure 5:
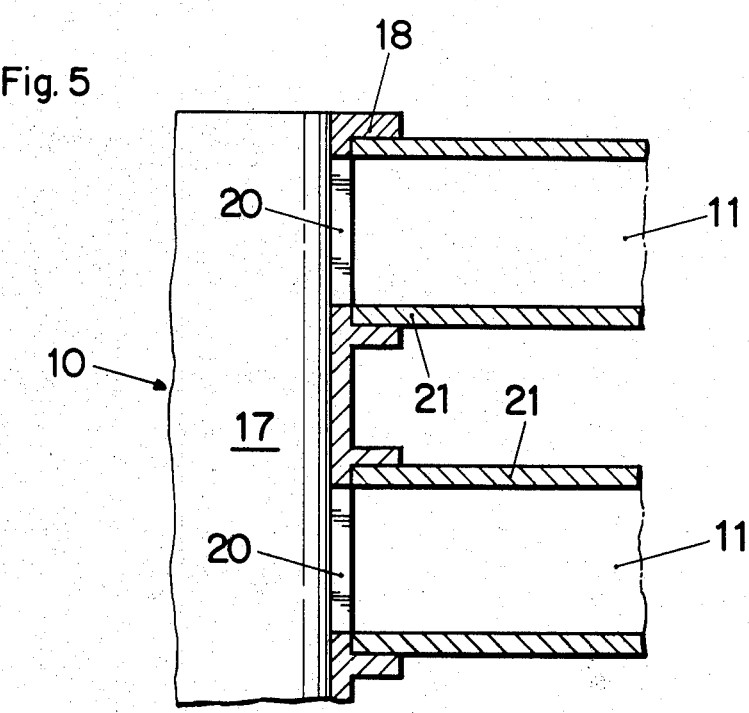
FIG. 5 a like illustration of a distribution head as in FIG. 2 in which are provided, in the vertical direction, several passthrough openings over one another with connected guideways.

FIG. 5 shows another example of embodiment of a distribution head 10. In this example of embodiment, the ring-cylindrical body 17 is structured essentially higher than in the case of the example of embodiment in accordance with FIGS. 1 to 4. As differentiated from this latter, arranged over one another in the direction of the axis of rotation are two or more passthrough openings 20, which increases the passthrough capacity of the distribution head 10. The passthrough openings 20, along with the guideways 11 connected to them, are spaced apart vertically, whereby a fan effect from the guideways 11 when the distribution head is rotating drops away to a great extent.

Figure 6:
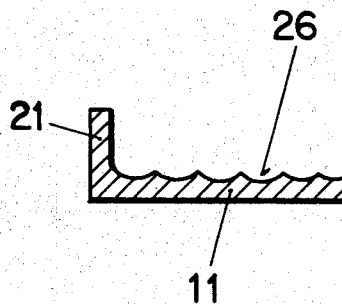
FIG. 6 a cross section through a guideway with longitudinal grooving.

For shelling of a granular product with oblong grains, as for example sunflower seeds, it is recommended to structure the guide surfaces 26 of guideways 11 grooved (FIG. 6). The grooves are parallel to each other and radially oriented. Grooving causes the grains to align themselves with their longitudinal axis in the direction of the grooves and to slide along in them such that they strike the deflecting plates 12 with their tapered ends, which facilitates separation of shell and kernel.

Figure 7:
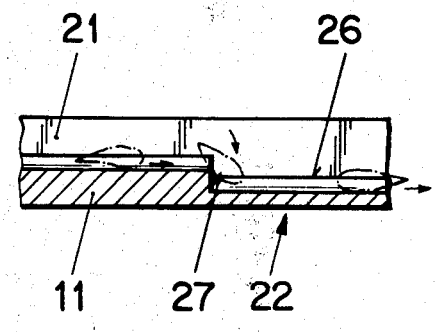
FIG. 7 a longitudinal cut through a stepped guideway with longitudinal grooving.

Particularly in the case of drop-shaped kernels, it can be advantageous if the guide surface 26 displays, in addition to the grooving, a rebounding step 27, as seen from above, which, as indicated in FIG. 7 in dash-dot lines, effects a reorientation of the grains so that they strike the deflecting plate 12 with the pointed end forward. The forms of embodiment for the guide surfaces shown in FIGS. 6 and 7 are particularly suited for sunflower seeds, for which an oblong, drop-shaped contour is characteristic.

Figure 8:
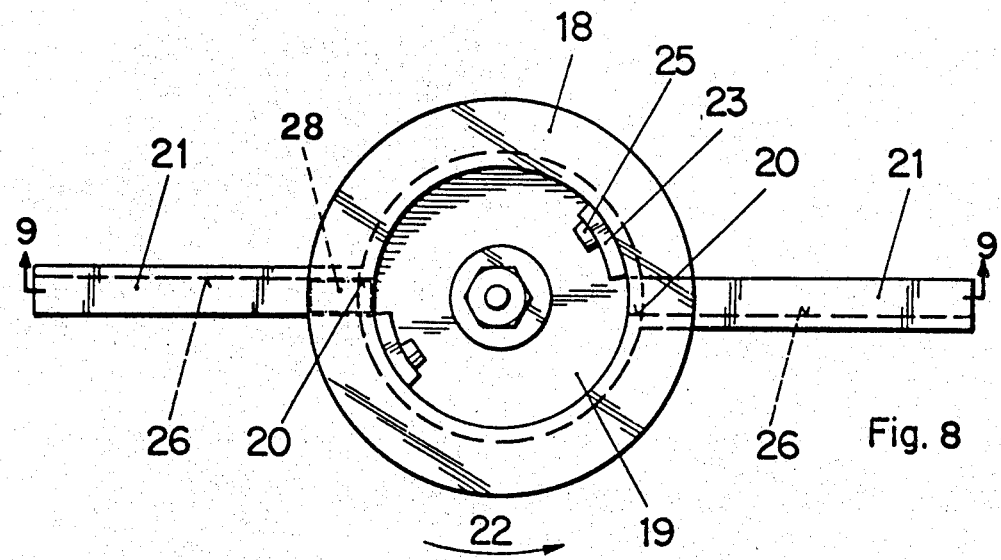
FIG. 8 is a top view onto an alternate embodiment.
Figure 9:
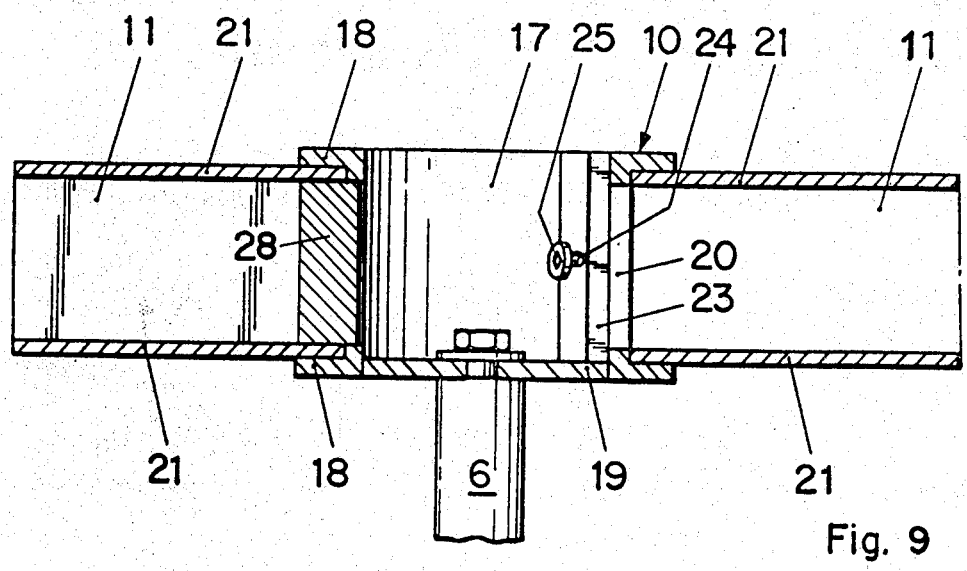
FIG. 9 is an enlarged cross-section illustration, corresponding to a line generally along 9—9 in FIG. 8.

In accordance with a further form of embodiment the distribution head 10 can display only a single passthrough opening 20 with one connected guideway 11. One possible configuration of this embodiment is indicated in FIGS. 8 and 9, showing a seal 28 inserted in one of the passthrough openings, whereby the corresponding guideway takes the mere function of a balancing weight on the distribution head 10 to equalize the unbalance. The need for a balancing weight can be dispensed with if one of the two passthrough openings 20 shown in FIG. 2 is closed, whereupon the adjoining guideway 11 exercises the functions of a balancing weight.

What is claimed is:

1. Apparatus for shelling a granular product of given grain size, such as soy beans, sunflower seeds and the like, comprising:
   (a) a housing having a distribution head mounted therein for rotation about its longitudinal axis;
   (b) said distribution head having a peripheral wall with at least one pass through opening therein to which is connected a radially oriented unenclosed guideway extending radially beyond said passthrough opening, said guideway having a generally U-shaped profile whose side walls point in the direction of rotation, said guideway having one generally flat guide surface extending between said side walls and facing in the direction of rotation;
   (c) said opening being structured as a slot, said slot defining a wall generally coplanar with the guide surface of the guideway, said slot extending longitudinally in the direction of the axis of rotation of said distribution head with the height of said opening in said longitudinal direction being at least three times its width, said width being preferably 1.5 to 3 times the grain width; and
   (d) means for rotating said head and said guideway at a speed such that product in said distribution head is carried out through said opening by centrifugal force and moves in a two dimensional distribution with the width of one layer along the guideway and retained on the flat surface so as to be thrown outwardly against said housing.

2. Apparatus according to claim 1 wherein at leat two rotational symmetrically arranged passthrough openings with connecting guideways are provided and wherein means are provided to adjust the width of the openings.

3. Apparatus in accordance with claim 1 or claim 2 wherein each guide surface (26) displays a step (27) of which the height is of the same order of magnitude as the size of the product, extending opposite to the direction of rotation and spaced from said distribution head to provide two levels of guide surface, whereby said granular product having drop-shape kernels is reorientated prior to striking said housing, thereby assuring said kernels strike said housing with a pointed end forward.

4. Apparatus in accordance with claim 1 wherein the distribution head displays, in a radial direction, only one passthrough opening with one connecting guideway.

5. Apparatus in accordance with claim 4 wherein the distribution head is provided with a balancing weight for the single guideway to equalize any unbalance caused by only one passthrough opening.

6. Apparatus for shelling a granular product of given grain size, such as soy beans, sunflower seeds and the like, comprising:
   (a) a housing having a distribution head mounted therein for rotation about its longitudinal axis;
   (b) said distribution head having a peripheral wall with at least one passthrough opening therein to which is connected a radially oriented unenclosed guideway extending radially beyond said passthrough opening, said guideway being unenclosed along a longitudinal extent thereof and having a guide surface facing in the direction of rotation;
   (c) said opening being structured as a slot, said slot defining a wall generally coplanar with the guide surface of the guideway, said slot extending longitudinally in the direction of the axis of rotation of said distribution head with the height of said opening in said longitudinal direction being at least three times its width, said width being preferably 1.5 to 3 times of the grain width;
   (d) means for rotating said head and said guideway at a speed such that product in said distribution head is carried out through said opening by centrifugal force and moves in a two dimensional distribution with the width of one layer along the guideway and retained on the flat surface so as to be thrown outwardly against said housing; and
   (e) means for adjusting the width of the passthrough opening in relation to the particular grain size.

7. Apparatus according to claim 6 wherein each guideway is channel-shaped member having a generally U-shaped cross section, having the guide surface as a bottom wall, and having two side walls facing in the direction of rotation.

* * * * *

UNITED STATES PATENT AND TRADEMARK OFFICE
CERTIFICATE OF CORRECTION

PATENT NO. : 4,341,152

DATED : July 27, 1982

INVENTOR(S) : Karl Solenthaler

It is certified that error appears in the above—identified patent and that said Letters Patent is hereby corrected as shown below:

Claim 2, line 1, delete "leat" and insert therefor --least--.

Signed and Sealed this

Second Day of November 1982

[SEAL]

Attest:

GERALD J. MOSSINGHOFF

Attesting Officer     Commissioner of Patents and Trademarks